Aug. 18, 1936.  C. E. SORENSEN ET AL  2,051,501
METHOD OF MAKING VEHICLE WHEELS
Filed March 6, 1935
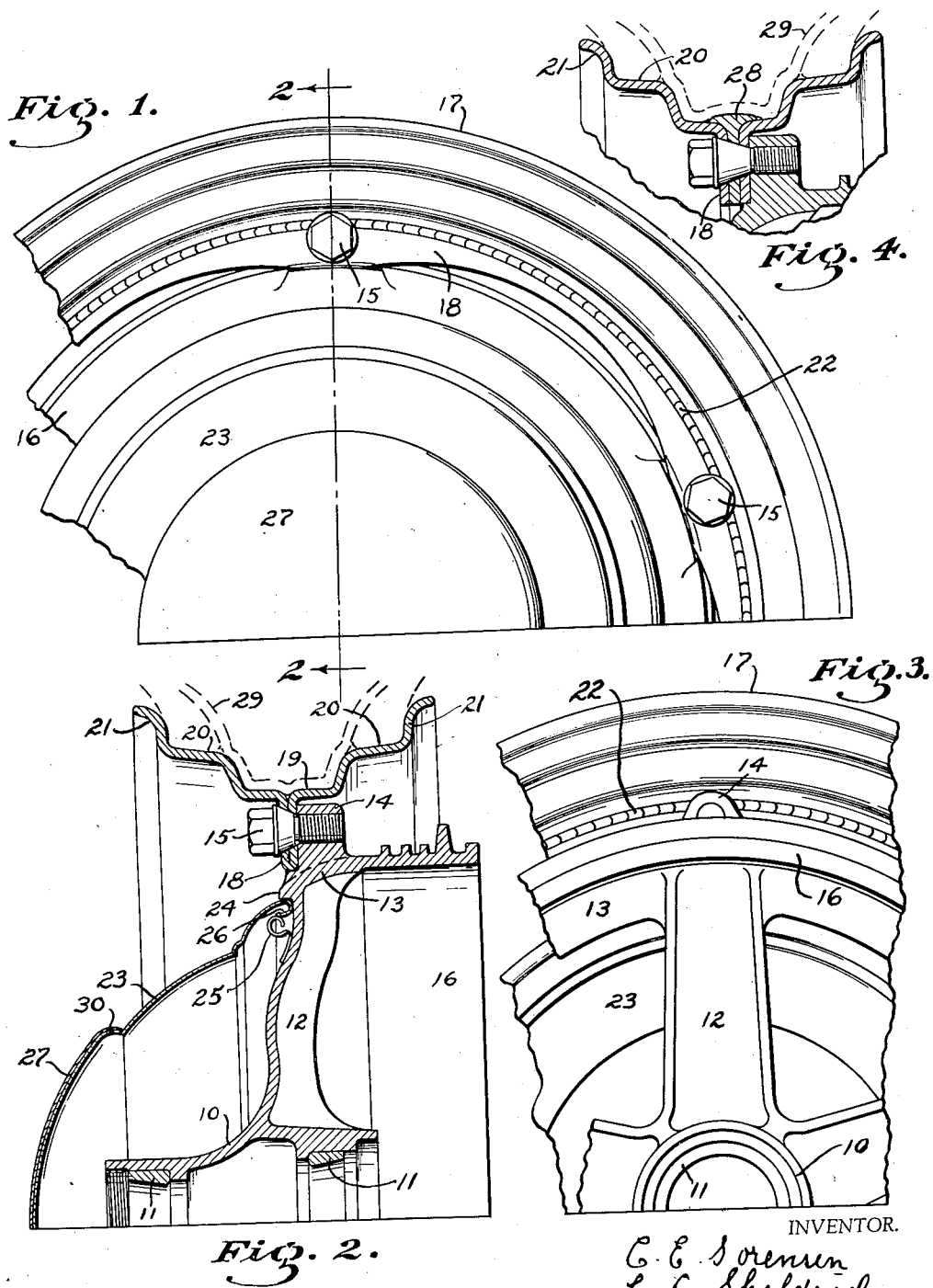
INVENTOR.
C. E. Sorensen
BY C. S. Sheldrick
ATTORNEY.

Patented Aug. 18, 1936

2,051,501

UNITED STATES PATENT OFFICE 2,051,501

METHOD OF MAKING VEHICLE WHEELS

Charles E. Sorensen, Detroit, and Laurence S. Sheldrick, Dearborn, Mich., assignors to Ford Motor Company, Dearborn, Mich., a corporation of Delaware Application March 6, 1935, Serial No. 9,544

3 Claims. (Cl. 29—159.1)

The object of our invention is to provide a wheel construction especially suitable for use on automobiles, which wheel will have a pleasing appearance, and which may be inexpensively manufactured.

A further object of our invention is to provide a wheel construction which will have a higher strength to weight ratio so as to reduce the unsprung weight of the car without lessening the safety factor thereof.

Still a further object of our invention is to provide a novel wheel rim construction which comprises two similar halves having reinforcing flanges thereon, these flanges serving not only to stiffen the wheel radially but also to form means whereby the rim may be secured to the wheel proper.

Still a further object of our invention is to provide a combination hub member, wheel and brake drum which is adapted to be formed as a unitary cast iron or alloy steel casting, thereby eliminating several machining operations and the retaining bolts and rivets heretofore required to secure these several elements together. An advantage arises from the use of a casting in that a more rigid drum with less weight is secured together with a better breaking surface.

With these and other objects in view, our invention consists in the arrangement, construction and combination of the various parts of our improved device, as described in the specification, claimed in our claims, and illustrated in the accompanying drawing, in which:

Figure 1 is a plan view of a portion of our improved wheel, viewed from the outer side.

Figure 2 is a sectional view, taken on the line 2—2 of Figure 1.

Figure 3 is a plan view of a portion of our wheel, viewed from the inside, and

Figure 4 is a sectional view illustrating an alternate rim construction which may be used in place of the preferred rim shown in Figure 2.

Referring to the accompanying drawing, we have used the reference numeral 10 to indicate generally a wheel hub which is formed as an open-ended tube having bearing races 11 secured in the respective ends thereof. The hub is rotatably mounted upon a conventional spindle arm by means of taper roller bearings which coact with the bearing races 11. The wheel shown is adapted for use as a steerable wheel; however, the hub 10 may be splined or keyed to a driving axle shaft in the conventional manner.

Five spokes 12 are formed integrally with the hub 10, these spokes extending radially where they terminate in a ring 13 which forms the periphery of the wheel. Five lugs 14 are cast integrally with the ring 13 and project radially from equally spaced positions around the ring. These lugs are tapped to each receive a rim retaining screw 15. A cylindrical brake drum 16 is cast integrally with the ring 13, this drum extending laterally from the inside face of the wheel and having a plurality of cooling fins formed around its periphery.

From the foregoing it will be noted that the hub 10, the spokes 12, the ring 13, the lugs 14 and the brake drum 16 are formed as a one-piece casting, this feature contributing materially to the light weight construction resulting. Inasmuch as the brake drum 16 is machined both inside and out, and inasmuch as the spokes 12 are of a channel-shaped cross section, which is easy to maintain uniform, very little metal need be removed from the ring 13 in order to place the wheel in running balance.

We have employed what is believed to be a novel rim construction, this rim comprising a pair of similar annular members 17 which comprise respectively the inside and outside halves of the rim. Each of these members has a flange 18 extending radially and inwardly from its inner edge, which flanges are secured together to form the rim unit. This rim is of the drop center type having a channel 19 formed therein around its center portion with bead supporting ledges 20 spaced on each side of the channel and with the bead retaining flanges 21 forming the outer edges of the rim. It is preferable to simultaneously roll both halves from one flat ring of metal so that the inner edges of the flanges 18 are connected; however, in order to give greater strength the flanges are welded together by means of a seam weld 22 which extends entirely around the flanges at the base of the channel 19. It will be noted that the flanges 18 are relatively deep at the bolt receiving openings and that these flanges are blanked out so as to gradually lessen in depth between these openings. Adequate ventilation between the wheel rim and the brake drum is thus provided without weakening the structural strength of the rim.

We have shown an alternate construction in Figure 4 from which it will be seen that the two halves of the rim are separated by a reinforcing ring 28 of T-shaped cross section. The two halves of such rim may be formed separately or they may be formed, as previously described, but with the entire inner joining edge of the flanges blanked out to provide separate halves. The position of the tire casing and inner tube is shown by dotted lines 29 in both Figures 2 and 4 from which it will be seen that the ring 28 prevents the tire from entering the pocket between the flanges. This reinforcing member is not believed essential for passenger car requirements although it has advantages for use where heavier loads are carried.

In order to present a more pleasing appearance for the wheel, we have provided a dish-shaped cover 23 which coacts with a lip 24 which projects from the outside edge of the ring 13. The cover 23 is drawn from sheet metal and may be of any desired shape just as long as it forms a closure for the hub and spokes of the wheel. Inasmuch as the brake drum 16 is provided with the conventional brake anchoring plate which forms a closure for the inner side of the brake drum, dirt is thereby excluded from the space around the hub member and the bearings in the hub. The cover 23 is resiliently secured to the wheel by means of five spring clips 25, these clips being secured to the spokes of the wheel and having their free ends adapted to coact with a bead 26 which is formed around the outer edge of the cover. It is only when it is desired to remove the wheel and brake drum from the spindle that the cover 23 need be removed for in the ordinary tire changes it is only necessary to remove the screws 15 from the lugs 14 to detach the rim.

In order to present a more pleasing appearance, an annular bead 30 is expanded from the intermediate portion of the cover 23 and a stainless steel cap 27 is snapped over the bead 26, the cap 27 having the appearance of the hub cap used on the conventional wheel.

Among the many advantages arising from the use of our improved device, it may be well to mention that we have provided a unitary hub, wheel and brake drum construction to which our improved rim is detachably secured, this structure having a greater strength to weight ratio than is believed attainable with other structures. A further feature of our device is that the rim having a separately inwardly projecting central flange resists radial loads better than when formed in the conventional manner.

Some changes may be made in the arrangement, construction and combination of the various parts of our improved device without departing from the spirit of our invention, and it is our intention to cover by our claims, such changes as may reasonably be included within the scope thereof.

We claim as our invention:

1. The method of forming a tire rim comprising rolling a cylinder of sheet metal so that the ends of said cylinder form tire bead ledges and bead retaining flanges, the center portion of said cylinder being rolled to form two inwardly extending flanges which have their inner edges connected, and then welding the outer edges of said inwardly extending flanges and blanking out portions of said inner connected edges.

2. The method of forming a tire rim comprising, rolling a cylinder of sheet metal so that the extreme ends thereof project outwardly in a radial direction to form a pair of tire bead retaining flanges, the portions of said cylinder adjacent to said flanges remaining substantially flat so as to form a pair of tire bead ledges, rolling the intermediate portions of said cylinder to a lesser diameter than said ledges so as to form the well portion of a drop center rim construction, the center portion of said cylinder being rolled inwardly to form two inwardly extending parallel flanges the inner edges of which are connected, and then welding the outer edges of said inwardly extending flanges.

3. The method of forming a tire rim comprising, rolling a cylinder of sheet metal so that the ends of the cylinder project outwardly in a radial direction to form a pair of tire bead retaining flanges, the portions of said cylinder adjacent to said flanges remaining substantially flat to form a pair of tire bead ledges, rolling the intermediate portion of said cylinder to a diameter less than said ledges to form the well portion of a drop center rim construction, the center portion of said cylinder being rolled inwardly to form two inwardly extending parallel flanges the inner edges of which are connected, then seam welding the outer edges of said inwardly extending flanges together, and then blanking out portions of the inner connected edges of said flanges.

CHAS. E. SORENSEN.
LAURENCE S. SHELDRICK.